Sept. 27, 1949.  G. H. WHITESIDE  2,482,890
CRASH SWITCH AND VALVE MEANS FOR VEHICLES
Filed Jan. 26, 1948

Glenn H. Whiteside
INVENTOR.

BY *Thomas A. O'Brien*
*Harvey B. Jacobson*
Attorneys

Patented Sept. 27, 1949

2,482,890

UNITED STATES PATENT OFFICE 2,482,890

CRASH SWITCH AND VALVE MEANS FOR VEHICLES

Glenn H. Whiteside, Excelsior Springs, Mo.

Application January 26, 1948, Serial No. 4,236

3 Claims. (Cl. 200—53)

This invention relates generally to safety devices for vehicles, and more particularly to a crash switch and valve means which will automatically close a valve in the fuel line and open the electrical circuits connected with the ignition means, lighting means and one other circuit in automotive vehicles, including automobiles, trucks, airplanes and water vehicles, in the event of a crash or upset of the vehicles.

A primary object of this invention is to avoid the likelihood of fire initiating at the scene of a crash involving vehicles having combustible fuel and electrical circuits, with a view to decreasing the danger to property and lives caused by collisions.

Another object of this invention is to provide a crash switch and valve means in which the arm used to support a mass disengageable therefrom at the time of a collision is operatively connected with switch means and a valve in such a manner that certain of the switches are opened on the initial movement of the arm, the valve means being actuated as a result of the movement of the arm through a major portion of its arc of movement, and the final movement of the arm causing the opening of an electrical switch after the valve means has been closed, this arrangement requiring only a comparatively small mass and spring to be used for actuation of fairly heavy switch means and valve means.

Still another object of this invention is to provide a crash switch and valve means in which a plurality of switches are incorporated with a spring-actuated pivoted arm in a novel and utilitarian manner, thus making it possible to have a light weight mechanism consecutively open all the chief electrical circuits in the vehicle and simultaneously to close the fuel line.

And a last object to be mentioned specifically is to provide a device of this character which is relatively inexpensive and practicable to manufacture, which is simple and easy to install and use, being automatic in action and easily reset, and which will give generally efficient and durable service.

With these objects definitely in view, this invention resides in certain novel features of construction, combination and arrangement of elements and portions which will be hereinafter described in the specification, particularly pointed out in the appended claims, and illustrated in the drawings which form a material part of this application, and in which:

Similar characters of reference designate similar or identical elements and portions throughout the specification and throughout the various views of the drawing.

Figure 1:
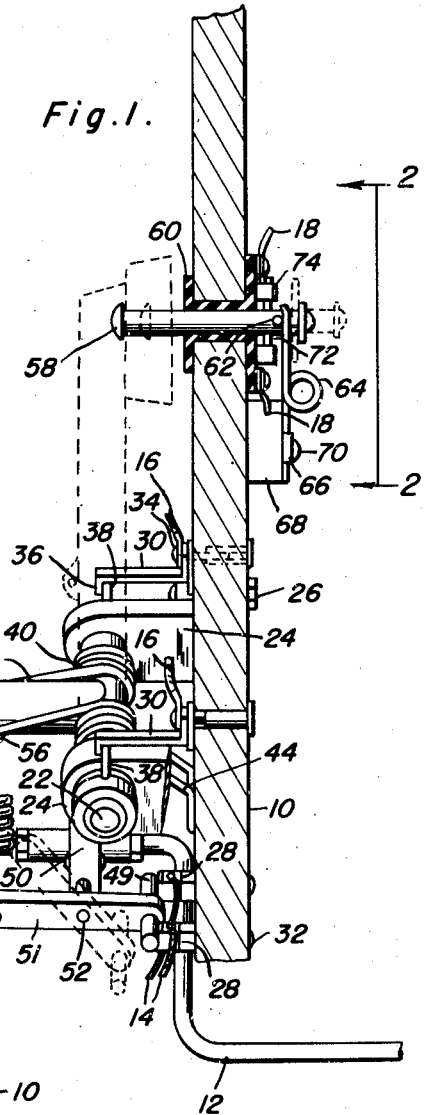
Figure 1 is a three-dimensional view of this invention operatively assembled in connection with a portion of an automotive vehicle including a fragmentary part of a fuel line and the terminals of electrical leads connected in various circuits in the vehicle.
Figure 2:
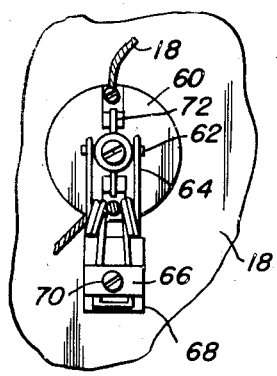
Figure 2 is a fragmentary rear elevational view, having a portion of this structure as viewed from a line 2—2 in Figure 1.
Figure 3:
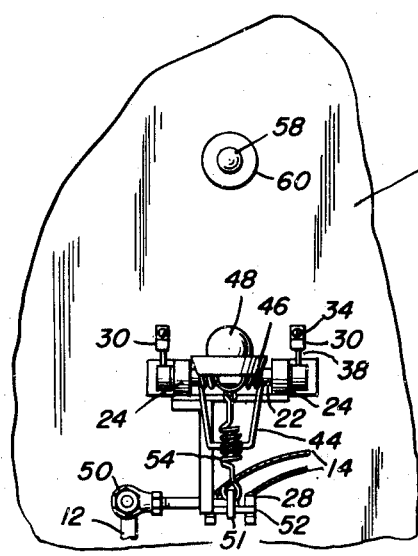
Figure 3 is a front elevational view of this invention and the environmental apparatus illustrated in Figure 1, the view being on a slightly reduced scale.

Referring now to the drawing in detail, the environment wherewith this invention is adapted to be used includes an automotive vehicle having a preferably upright supporting member 10, a fuel line 12, and electrical leads 14, 16 and 18 which will be incorporated in the electrical circuits of the vehicle, such as the ignition, head lamps, and another circuit or combination of circuits determined by the character of the vehicle wherewith this invention is to be used.

This invention envisages provision of an arm 20 having a transverse axis member 22 integral therewith and pivotally mounted in bracket members 24 which are, in turn, rigidly mounted as by bolts 26 to the support 10 which is preferably of insulated character. Obviously, if the support 10 is not of insulated character mere mechanical skill will be sufficient to provide for proper insulation of the leads 14 and 16 and the contacts 28 and 30 connected thereto and supported by screws 32 and 34 of any suitable character. The contacts 30 are of very simple character comprising angle members having portions 36 depending from their forward ends for electrical engagement with pins 38 carried by the transverse axis member 22.

The arm 20 is biased to pivot upwardly on an integral transverse axis member 22 under the action of a spring 40 coiled around the transverse axis member 22 and having forwardly extending terminal portions 42 adapted to engage the under surface of the arm 20 at a point intermediate the ends thereof, and other portions 44 adapted to engage the support 10. The outer end of the arm 20 is flattened and apertured to receive an attaching screw whereby a cup 46 is secured to support a mass 48 which may be of ball form, in such manner that a jar of the arm will readily cause the disengagement of the mass 48 from the cup 46. The mass 48 is sufficient to weight the arm 20 to downward position as illustrated in Figure 1, against the action of the spring 40.

From the foregoing, it will be obvious that when the mass 48 has been jarred from the cup 46, movement of the arm 20 upwardly will break electrical contact between the pins 38 and the contact members 36. This is the first useful operation resulting from the pivotal movement of the arm 20. The second result of this movement is the disengagement of the transverse bar contact 49 on the end of the lever 51 from the contacts 28, and the third action is the closing of the valve 50 by this same lever 51 and the valve stem 52. It should be noted that the valve 50 is mounted in the fuel line 12 and immediately beneath the transverse axis member 22, and the valve stem 52 pivoted on the housing of the valve 50 supports the lever 51 so that a spring 54 may be terminally secured to the forward end of the lever 51 and a lug 56 on the under side of the arm 20, thus providing a resilient link between the lever 51 and the arm 20. This construction will obviously allow a slight movement of the arm 20 before the lever is actuated sufficiently to break electrical contact between the member 49 and the contacts 28.

When the arm 20 has moved sufficiently forwardly to close the valve 50, continuation of the movement of the arm 20 brings the lug 56 into position so that the effectiveness of the spring 54 (in counteraction) to the spring 40 is greatly decreased, when this arm is in the second position illustrated in dash line on Figure 1. The result of this arrangement is to allow the full force of the spring 40 to urge the upper end of the arm 20 into operative engagement with the plunger 58 insulatively and slidably mounted in a grommet 60 on the support 10. This plunger has a transversely disposed pin 62 which is engaged by the upper ends of a pair of coiled springs 64 which may be joined at their lower ends for securement by a bracket 66 to a block 68 secured by a screw 70 to the support 10, so as to urge the plunger 58 forwardly or to the left in Figure 1. This plunger 58 carries a transversely disposed contact bar 72 engageable in one position with a pair of spring contacts 74 mounted on the grommet member 60 and diametrically disposed with reference to the plunger 58. These spring contacts 74 are connected to the leads 18.

The operation of this invention will be clearly understood from the foregoing description of the mechanical details thereof, taken in connection with the drawings and the above recitation of the objects sought to be achieved by this invention. Further advantages will now be apparent, relating to the ultimate simplicity whereby a plurality of switches and a valve are operated consecutively in such manner that a relatively light spring member and a comparatively small and non-bulky apparatus may effectually carry out the functions required thereof. The advantage in controlling a number of electrical circuits, rather than attempting to use a master switch controlling all of the electrical circuits in the vehicle, will be obvious to any one skilled in the art to which this invention appertains, since no relays are required and the danger of undue sparking due to the breaking of a circuit carrying a very heavy load is obviated. The ease with which the instant invention may be incorporated with the motor vehicle and the simplicity of the operation of this invention will also now be clearly apparent.

Minor variation in the exact construction and the proportionment of the various elements of this invention may be resorted to without departure from the spirit and scope of this invention, which scope should be determined in accordance with a proper interpretation of the terminology used in the subjoined claims.

Having described the invention, what is claimed as new is:

1. A crash switch and valve means for vehicles comprising an arm pivoted on a vehicle, a mass loosely held on the free end of said arm retaining the arm in one position, a spring to bias the arm into a second position when said mass is disengaged from said free end by jarring of the vehicle, a valve having a stem and a lever thereon, a link between said arm and said lever to close said valve when the arm is moved into said second position, and an electric switch actuated by said arm when said arm reaches said second position and after said valve has been actuated into closed position, said link being resilient and arranged so that the action of said spring is consecutively and fully applied to the closing of said valve and thereafter to the actuation of said switch.

2. A crash switch and valve means for vehicles comprising an arm pivoted on a vehicle, a mass loosely held on the free end of said arm retaining the arm in one position, a spring to bias the arm into a second position when said mass is disengaged from said free end by jarring of the vehicle, a valve having a stem and a lever thereon, a link between said arm and said lever to close said valve when the arm is moved into said second position, and an electric switch actuated by said arm when said arm reaches said second position and after said valve has been actuated into closed position, said link being resilient and arranged so that the action of said spring is consecutively and fully applied to the closing of said valve and thereafter to the actuation of said switch, said switch having a spring biased plunger engageable by said arm, said spring being adapted to overcome the spring in the spring biased switch and to hold the spring biased switch in open position.

3. A crash switch and valve means for vehicles comprising an arm pivoted on a vehicle, a mass loosely held on the free end of said arm retaining the arm in one position, a spring to bias the arm into a second position when said mass is disengaged from said free end by jarring of the vehicle, a valve having a stem and a lever thereon, a link between said arm and said lever to close said valve when the arm is moved into said second position, and an electric switch actuated by said arm when said arm reaches said second position and after said valve has been actuated into closed position, said link being resilient and arranged so that the action of said spring is consecutively and fully applied to the closing of said valve and thereafter to the actuation of said switch, said switch having a spring biased plunger engageable by said arm, said spring being adapted to overcome the spring in the spring biased switch and to hold the spring biased switch in open position, and another pair of electrical switches actuated consecutively at the beginning of the movement of said arm from said one position and before the actuation of said valve, said switches having contacts carried by said arm and by said lever, the contacts on the lever being actuated after the contacts on said arm due to the resiliency of said link.

GLENN H. WHITESIDE.

REFERENCES CITED

The following references are of record in the file of this patent:

UNITED STATES PATENTS

| Number | Name | Date |
| --- | --- | --- |
| 1,843,674 | Hinds | Feb. 2, 1932 |
| 2,223,097 | Ehret | Nov. 26, 1940 |